United States Patent

[11] 3,573,851

[72] Inventors William J. Watson;
William D. Kastner; Thomas E. Cooper,
Richardson, Tex.
[21] Appl. No. 744,190
[22] Filed July 11, 1968
[45] Patented Apr. 6, 1971
[73] Assignee Texas Instruments, Incorporated
Dallas, Tex.

[54] MEMORY BUFFER FOR VECTOR STREAMING
10 Claims, 13 Drawing Figs.

[52] U.S. Cl. .......... 340/172.5
[51] Int. Cl. .......... G06f 9/00
[50] Field of Search .......... 340/172.5; 235/157

[56] References Cited

UNITED STATES PATENTS

| | | | |
|---|---|---|---|
| 3,047,228 | 7/1962 | Bauer et al. | 340/172.5 |
| 3,106,698 | 10/1963 | Unger | 340/172.5 |
| 3,153,776 | 10/1964 | Schwarz | 340/172.5 |
| 3,198,939 | 8/1965 | Helbig et al. | 340/172.5X |
| 3,248,528 | 4/1966 | Campeau | 340/172.5X |
| 3,343,140 | 9/1967 | Richmond et al. | 340/172.5 |
| 3,462,741 | 8/1969 | Bush et al. | 340/172.5 |
| 3,331,954 | 7/1967 | Kinzie et al. | 340/172.5X |
| 3,496,550 | 2/1970 | Schachner | 340/172.5 |
| 3,508,204 | 4/1970 | Cutaia | 340/172.5 |
| 3,509,542 | 4/1970 | Ehrman | 340/172.5 |
| 3,440,661 | 4/1969 | Falkoff et al. | 2/14 |

OTHER REFERENCES

THE PARALLEL AND THE PIPELINE COMPUTERS William R. Graham; pp. 68— 71; DATAMATION; Apr. 1970.

*Primary Examiner*—Paul J. Henon
*Assistant Examiner*—Harvey E. Springborn
*Attorneys*—Samuel M. Mims, Jr., James O. Dixon, Andrew M. Hassell, Harold Levine, Grossman: Rene E., Melvin Sharp and Richards, Harris and Hubbard

ABSTRACT: A data processing system is provided with a central processing unit with an arithmetic unit which is accessible from memory over two buffered channels and accessible to memory over one buffered channel. The central processing unit is provided with a program addressable register file for storage of machine language vector parameters. A common set of parameter and working storage registers is provided for control of the buffered input and output channels and for control of the operation of the central processing unit. A control means is responsive to a program instruction for loading machine language vector parameters from the register file into the storage registers for the ordered handling of vector data by the central processing unit.

MEMORY BUFFER FOR VECTOR STREAMING

This invention relates to a digital computer wherein stored instructions for complex vector operations are specified at the machine language level. More particularly, control of a central processing unit is provided by the transfer of machine language vector parameters stored in the central processing unit to a parameter and working storage register file in said unit for control of a plurality of buffering channels which service the central processing unit.

All elementary operations defined on individual variables are extended consistently to vectors as component-by-component operations. For example, $z = x + y \leftrightarrow z_i = x_i + y$ $z = x \times y \leftrightarrow A' z_i = xPy_1,$ $z = xy \leftrightarrow A - z_i = x_i y_1,$ $z = x| - |z_i = |x_i|,$ $w = u \Lambda v \leftrightarrow w_i = u_i \Lambda v_i,$ $w = (x < y) \leftrightarrow w_i = (x_i < y_i).$ Thus if $x$=(1,0,1,1) and $y$=(0,1,1,0) then $x+y$=(1,1,2,1), $x\Lambda y$(0,0,1,0), and $(x<y)$=(0,1,0,0).

A matrix $M$ is the ordered two-dimensional array of variables $M_1^1, M_{21}, ...., M_v^1{}_{(M)}$ $M_1^2, M_2^2, ..., M_v^2{}_{(M)}$ $M_1^{\mu(M)}. ., M_{v(M)}^{\mu M}$ The vector $(M_1^i, M_2^i, ..., M_v^i)$ is called the $i$th row vector of $M$ and is denoted by $M^i$. Its dimension $v(M)$ is called the row dimension of the matrix. The vector $(M_j^1, M_j^2, !, M_j^\mu)$ is called the $j$th column vector of $M$ and is denoted by $M_j$. Its dimension $\mu(M)$ is called the column dimension of the matrix.

The variable $M_j^i$ is called the $(i,j)$ th component or element of the matrix. Operations defined on each element of a matrix are generalized component by component to the entire matrix. Thus, if O is any binary operator, $P = M \text{ O } N \leftrightarrow P_j^i = M_j^i \text{ O } N_j^i.$ The term "vector" is described in the book A Programming Language, Kenneth E. Iverson, published 1962 by John Wiley and Sons, Incorporated. A vector $x$ is the ordered array of elements $(x_1, x_2, x_3, ..., x_{v(x)})$. The variable $x_i$ is called the $i$th component of the vector $x$, and the number of components, denoted by $v(x)$ (or simply $v$ when the determining vector is clear from context), is called the dimension of $x$. A numerical vector $x$ may be multiplied by a numerical quantity $k$ to produce the scalar multiple $k \times x$ (or $kx$) defined as the vector $z$ such that $z_i = k \times x_i$.

A parameter is a quantity that is assigned a temporary constant value in order to modify, control or influence a process or procedure. Machine language vector parameters are parameters controlling vector operations.

The rate at which a data processing system may carry out its operations has been progressively improved since the advent of electronic digital computers such as the Eniac at the University of Pennsylvania. The Eniac is described and claimed in U.S. Pat. No. 3,120,606.

Advancements in component technology have been such as to shift the limitations on processor speed from the components thereof to conductors that interconnect the components which because of their lengths, may become limiting due to time of travel of data thereover. The time required for carrying out a typical logic and some arithmetic operations in more advanced machines has been reduced to below about 100 nanoseconds. Thus, the developments in component technology have made possible the execution of operations in arithmetic units written in time intervals which are less than the intervals required by memory and memory transfer systems now available to supply data to and receive data from the arithmetic unit.

It has been found that in processing certain types of data, the overall operation of a processing unit can be greatly enhanced by taking advantage of the repetition involved in many operations on all or parts of the same data. The present invention is directed to a data processor which is particularly adapted to the handling of large blocks of well ordered data and wherein the maximum speed of operations in the arithmetic unit is utilized.

The present invention relates to a new computer system having the versatility necessary for handling conventional types of data processing operations but particularly adaptable to the high speed processing of large sets of ordered data. The computer is an advanced scientific computer capable of utilizing the arithmetic unit at high efficiency in data processing operations that heretofore have employed a fairly complex dialog between a central processing unit and the memory system.

The invention involves use of a processor capable of specifying complex vector operations at the machine level. The system includes a central processing unit which has an arithmetic unit therein accessible from memory over two buffered channels and accessible to memory over one buffered channel with a program addressable register file adapted for storage of machine language vector parameters. The buffers include parameter and working storage registers, the registers being connected to control the operation of the arithmetic unit. Means are then provided which are responsive to a program instruction for loading desired machine language vector parameters from the register file into the buffer storage registers whereby large sets of data may be processed directly and continuously in response to the occasional specifying at the machine level of the complex vector operations.

In a more specific aspect there is provided a means for storage of data words in simultaneously retrievable groups of $N$ words per access cycle in the memory. An arithmetic unit is then provided for processing data words in a timer interval which is less than the period of one memory access cycle. A first buffer register is provided for receiving groups of $N$ words at a time from the memory with a second buffer register provided for receiving groups of $N$ words at a time from the first buffer register. Means are then provided for transferring words from the second buffer register means to the arithmetic unit serially and at intervals less than the period of the memory cycle. This transfer of words is in response to means actuated in dependence upon the status of execution of an instruction in the arithmetic unit for control of the selection of succeeding groups of $N$ data words to be transferred from memory into the first buffer register.

For a more complete understanding of the invention and for further objects and advantages thereof, reference may now be had to the following description taken in conjunction with the accompanying drawings in which.

Figure 1:
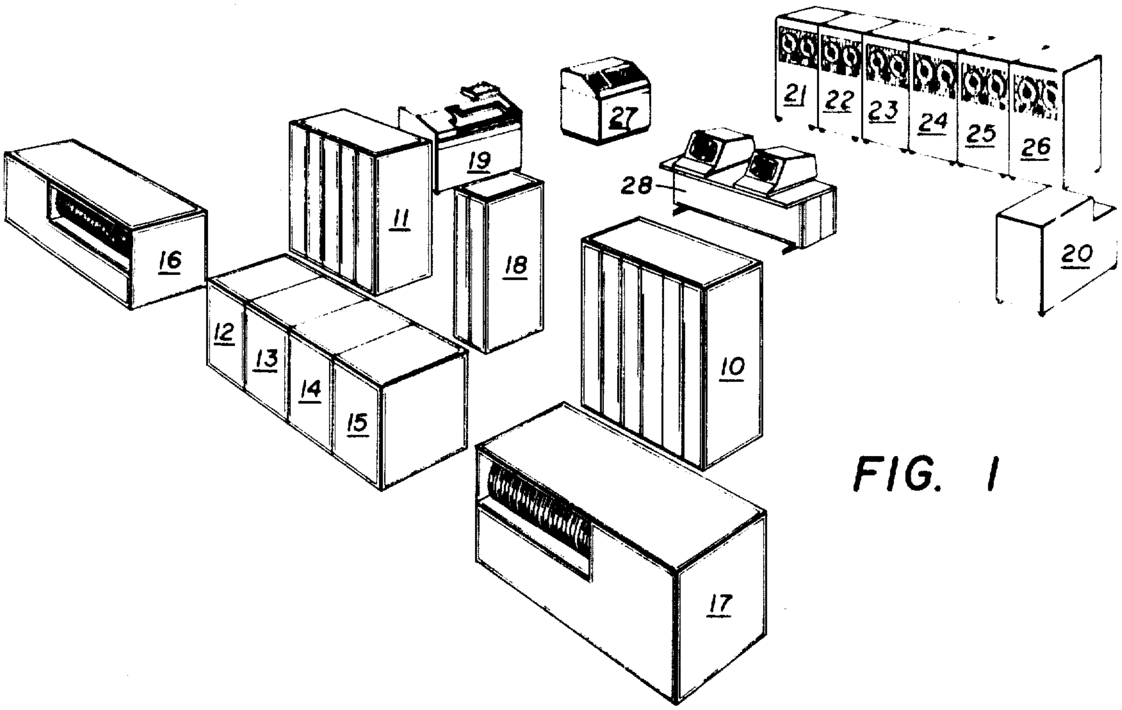
FIG. 1 illustrates a preferred arrangement of the components of the system.
Figure 2:
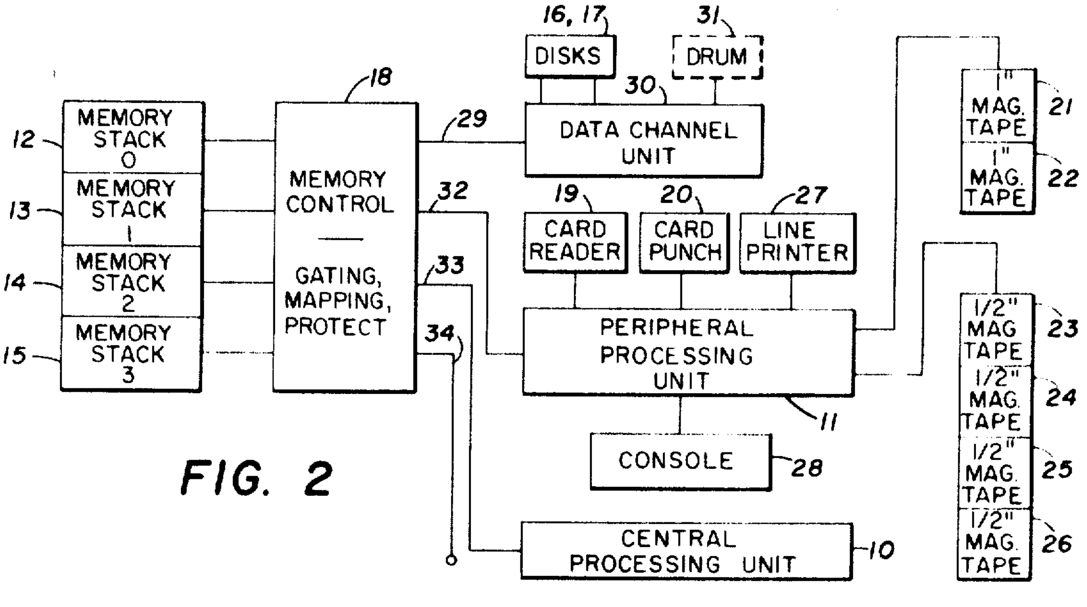
FIG. 2 is a block diagram of the system of FIG. 1.
Figure 10:
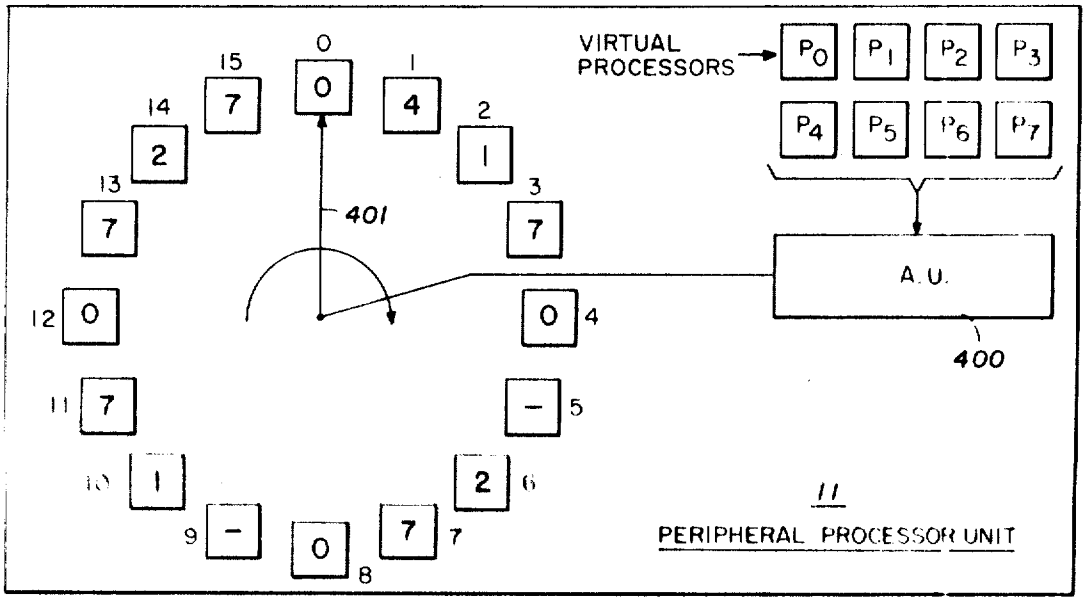
Figure 11:
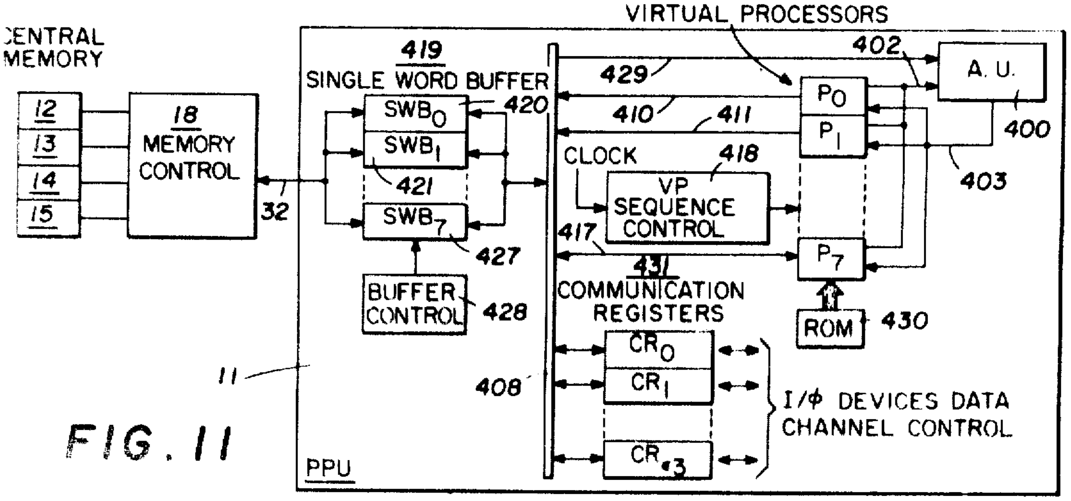
Figures 12, 13:
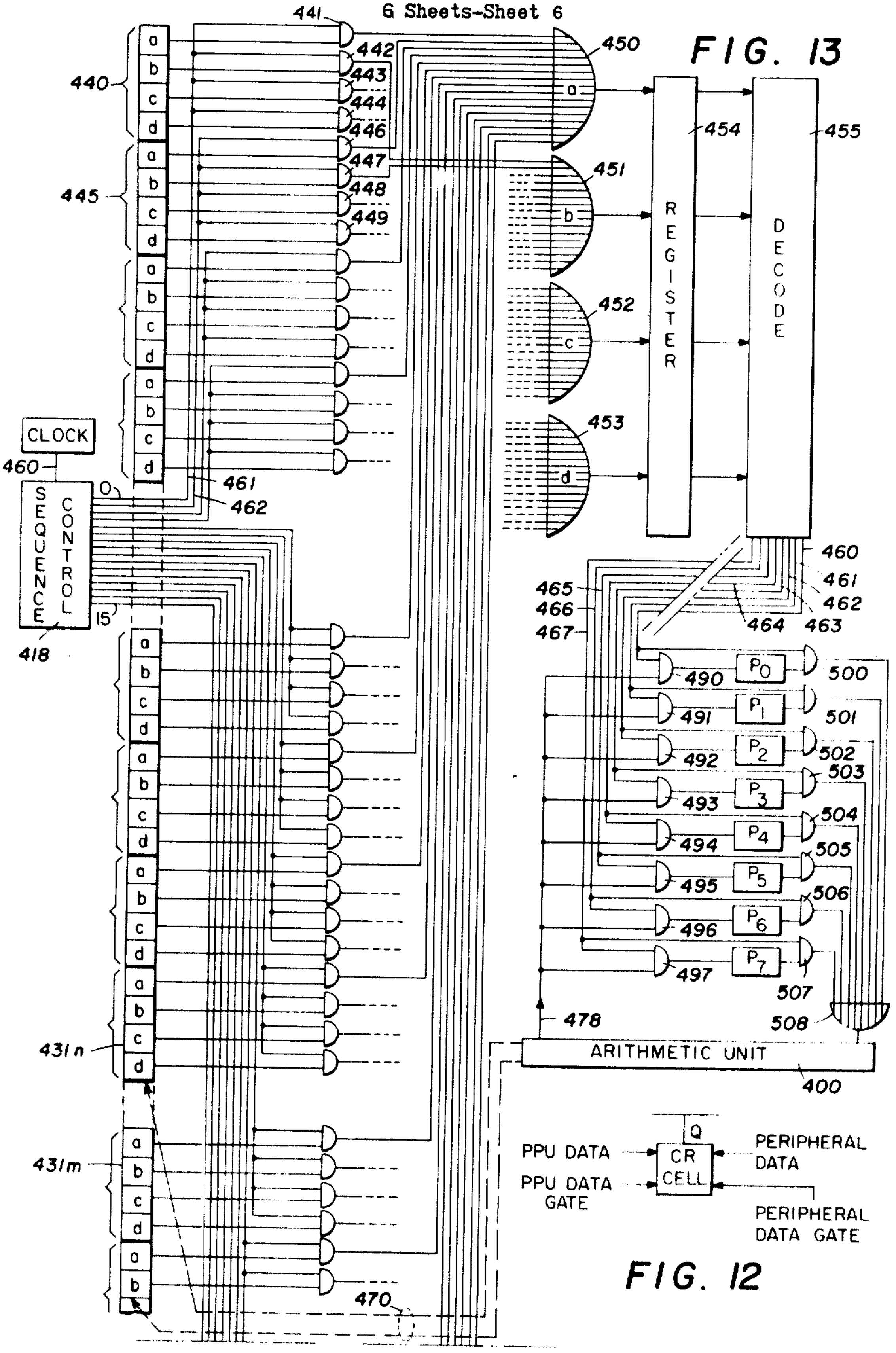

FIG. 10 diagrammatically illustrates time sharing of virtual processors in the peripheral processor of FIGS. 1 and 2;

FIG. 11 is a block diagram of the peripheral processor;

FIG. 12 illustrates access to cells in the communication register of FIG. 11; and FIG. 13 illustrates the sequencer 418 of FIG. 11.

Figures 5, 6, 7:
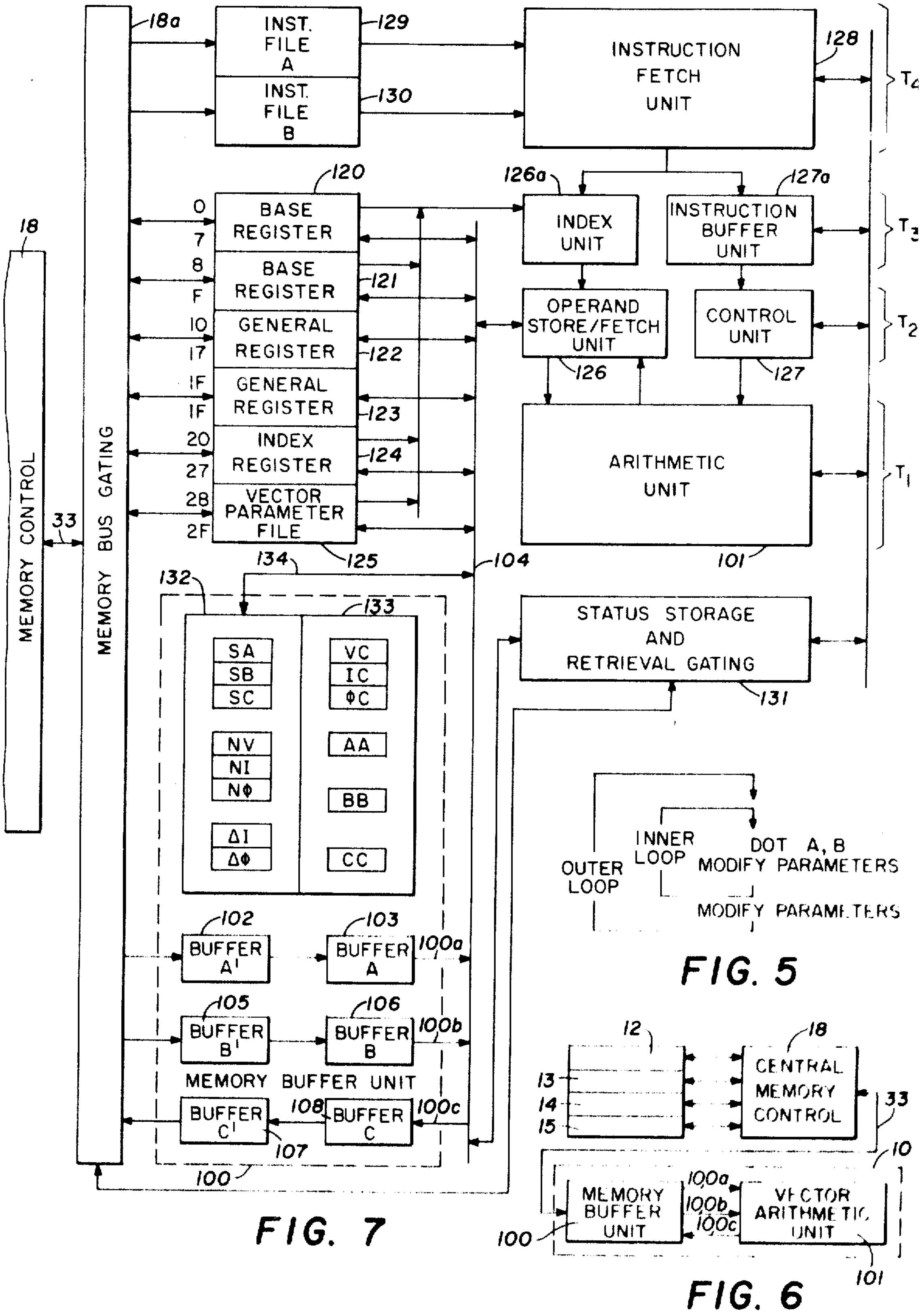
FIG. 5 is a functional diagram of the central processing unit of FIGS. 1—4.
FIG. 6 illustrates memory buffering for vector streaming to an arithmetic unit.
FIG. 7 is a block diagram of the central processor unit of FIGS. 1—4.
Figure 8:
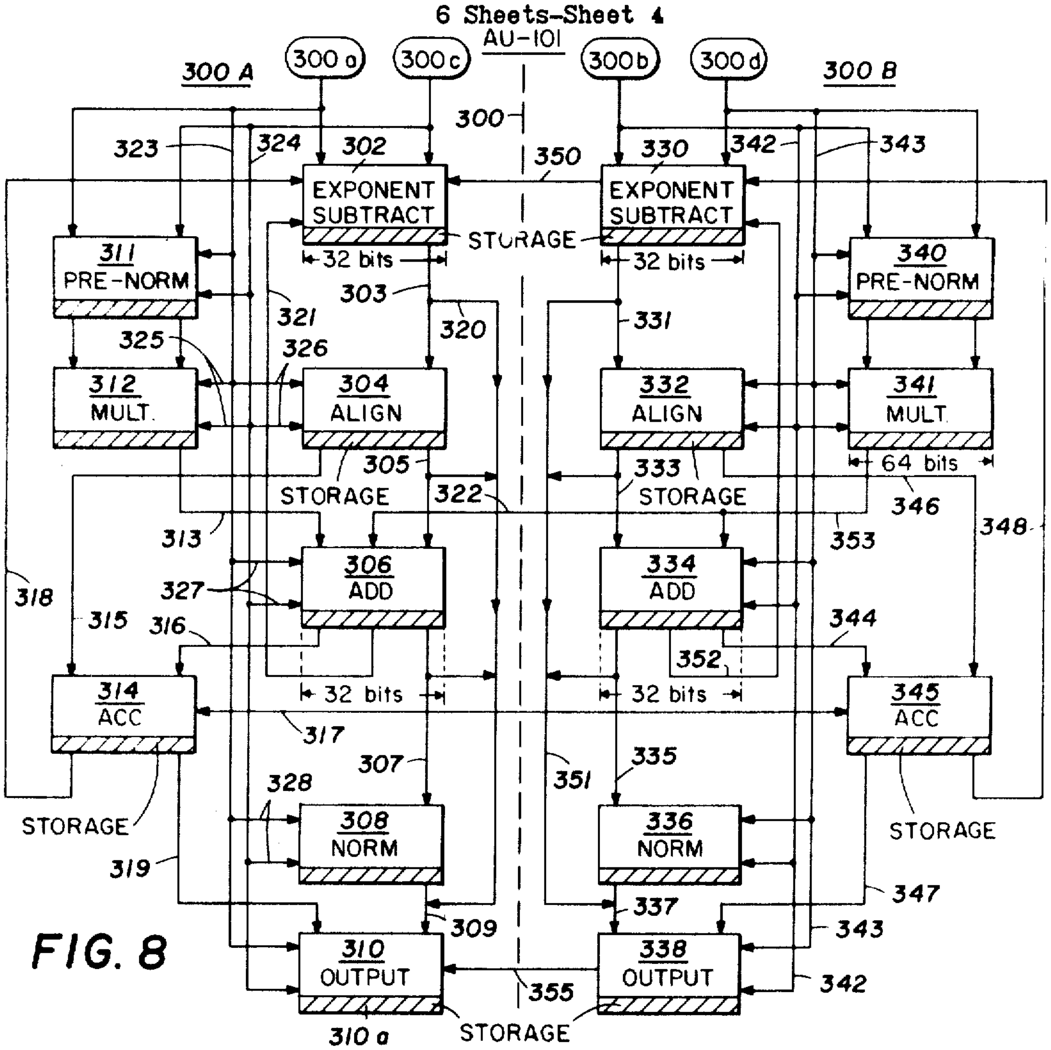
FIG. 8 illustrates a double pipeline arithmetic unit for the CPU of FIGS. 1 and 2.

The pipeline system shown in FIGS. 7 and 8 is described and claimed in copending application Ser. No. 743,573, filed Jul. 9, 1968, by Charles M. Stephenson and William J. Watson.

The automated context switching operation and system shown in FIGS. 3, 4, 8 and 9 is described and claimed in copending application Ser. No. 743,572, filed Jul. 9, 1968, by William D. Kastner and William J. Watson.

The time slot assignment system shown in FIGS. 10—13 is described and claimed in copending application Ser. No. 756,690, filed Aug. 30, 1968, by Edwin H. Husband and William J. Watson.

In order to understand the present invention the advanced scientific computer system of which the present invention forms a part will first be described generally and then individual components and the role of the present invention and its interreaction with other components of the system will be explained.

FIG. 1

Referring to FIG. 1, the computer system includes a central processing unit (CPU) 10 and a peripheral processing unit (PPU) 11. Memory is provided for both CPU 10 and PPU 11 in the form of four modules of thin film storage units 12—15. Such storage units may be of the type known in the art. In the form illustrated, each of the storage modules provides 16,384 data words.

The memory provides for 160 nanosecond cycle time and on the average 100 nanosecond access time. Memory blocks of 256 bits each are divided into eight zones of 32 bits each. Each zone constitutes a data word. Thus, the memory data words are stored in blocks of eight blocks and there are 2,048 data memory blocks per module.

In addition to storage modules 12—15, rapid access disc storage modules 16 and 17 are provided wherein the access time on the average is about 16 milliseconds.

A memory control unit 18 is also provided for control of memory operation, access and storage.

A card reader 19 and a card punch unit 20 are provided for input and output. In addition, tape units 21—26 are provided for input/output (I/O) purposes as well as storage. A line printer 27 is also provided for output service under the control of the PPU 11.

It is to be understood that the processor system thus has a memory or storage hierarchy or four levels. The most rapid access storage is in the CPU 10. The next most rapid access is in the thin film storage units 12—15. The next most available storage is the disc storage units 16 and 17. Finally, the tape units 21—26 complete the storage array.

A twin cathode-ray tube (CRT) monitor console 28 is provided. The console 28 consists of two adapted CRT-keyboard terminal units which are operated by the PPU 11 as input/output devices. It can also be used through an operator to command the system for both hardware and software checkout purposes and to interact with the system in an operational sense, permitting the operator through the console 28 to interrupt a given program at a selected point of review of any operation, its progress or results, and then to determine the succeeding operation. Such operations may involve the further processing of the data or may direct the unit to undergo a transfer in order to operate on a different program or on different data.

Within the system thus illustrated and briefly described, there are several combinations of elements which cooperate one with another in a new and unique manner to permit the significant overall enhancement of the capability of the system to process data particularly where the data is in well ordered sets of substantial quantity.

One such combination provides for automatic context switching in a multiprogrammed multiprocessor system wherein there is provided for a unique relationship between the central processor 10 and the peripheral processor 11.

In a further aspect, a special system is provided within the CPU 1 to provide for the accommodation of data at a significantly higher rate than heretofore possible employing buffering in the ordered introduction of data into the arithmetic unit.

A further aspect involves a unique form of pipelining whereby parallelism of significant degree is achieved in the operations within and without the arithmetic unit.

A still further aspect involves provision for time sharing a plurality of virtual processors included in the PPU 11.

FIG. 2

Before discussing the foregoing features of the system individually there will first be described in a more general way the organization of the computer system by reference to FIG. 2. Memory stacks 12—15 are controlled by the memory control 18 in order to input or output word data to and from the memory stacks. Additionally, memory control 18 provides gating, mapping, and protection of the data within the memory stacks as required.

A signal bus 29 extends between the memory control 18 and a buffered data channel unit 30 which is connected to the discs 16 and 17. The data channel unit 30 has for its sole function the support of the memory shown as discs 16 and 17 and is a simple wired program computer capable of moving data to and from memory discs 16 and 17. Upon command only, the data channel unit 30 may move memory data from the discs 16 and 17 via the bus 29 through the memory control 18 to the memory stacks 12—15.

Two bidirectional channels extend between the discs 16 and 17 and the data channel unit 30, one channel for each disc unit. For each unit, only one data word at a time is transmitted between that unit and the data channel unit 30. Data from the memory stacks 12—15 are transmitted to and from the data channel 30 through the memory control 18 in eight-word blocks.

A magnetic drum memory 31 (shown dotted), if provided, may be connected to the data channel unit 30 when it is desired to expand the memory capability of the computer system.

A single bus 32 connects the memory control 18 with the PPU 11. PPU 11 operates all I/O devices except the discs 16 and 17. Data from the memory stacks 12—15 are processed to and from the PPU via the memory control 18 in eight-word blocks.

When read from memory, a read/restore operation is carried out in the memory stack. The eight words are "funneled down" with only one of the eight words being used within the PPU 11. This "funneling down" of data words within the PPU 11 is desirable because of the relatively slow usage of data required by the PPU 11 and the I/O devices, as compared with the CPU 10. A typical available word transfer rate for an I/O device controlled by the PPU 11 is about 100 kilowords per second.

The PPU 11 contains eight virtual processors therein, the majority of which may be programmed to operate various ones of the I/O devices are required. The tape units 21 and 22 operate upon a 1 inch wide magnetic tape while the tape units 23—26 operate with ½-inch magnetic tapes to enhance the capabilities of the system.

The PPU 11 operates upon the program contained in memory and executed by virtual processors in a most efficient manner and additionally provide monitoring controls to programs being run in the CPU 10.

The virtual processors may be of the type illustrated and described in U.S. Pat. No. 3,337,854 to Cray et al. In that patent, the virtual processor occupies six time slots as opposed to the virtual processors referred to herein which have variable time slots. The virtual processors as disclosed take instructions from either read-only memory or the central memory, and operate upon these instructions. The virtual processors include program counters and the time-shared arithmetic unit in a peripheral processing unit. The virtual processors execute programs under instruction control.

CPU 10 is connected to memory stacks 12—15 through the memory control 18 via a bus 33. The CPU 10 may utilize all eight words in a word block provided from the memory stacks 12—15. Additionally, the CPU 10 has the capability of reading or writing any combination of those eight words. Bus 33 handles three words every 50 nanoseconds, two words input to the CPU 10 and one word output to the memory control 18.

As will be later described, the CPU 10 has the capability of carrying out compound vector operations specified directly at machine level without the requirement of translation of some compiler language. This capability eliminates the requirement of piecemeal instructions for a long stream of operations, as the CPU 10 executes long operations with a single instruction. This capability of the CPU 10 is provided by particular buffering operations provided between the memory control 18 and the arithmetic unit in CPU 10. In addition, an improved pipelining data operation is provided within and around the arithmetic unit contained within the CPU 10.

A bus 34 is provided from the memory control 18 to be utilized when the capabilities of the computer system are to be enlarged by the addition of other processing units and the like.

Each of the buses 29, 32, 33 and 34 is independently gated to each memory module, thereby allowing memory cycles to be overlapped to increase processing speed. A fixed priority preferably is established in the memory controls to service conflicting requests from the various units connected to the memory control 18. The internal memory control 18 is given the highest priority, with the external buses 29, 32, 33 and 34 being serviced in that order. The external bus-processor connectors are identical, allowing the processors to be arranged in any other priority order desired.

FIG. 3

Figure 3:
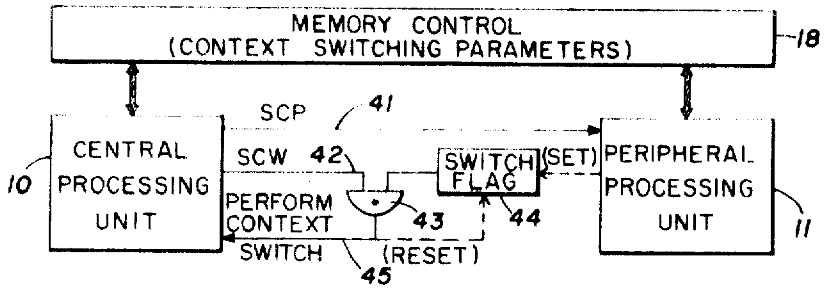
FIG. 3 is a block diagram which illustrates context switching between the central processor unit and the peripheral processor unit of FIGS. 1 and 2.

FIG. 3 illustrates in block diagram, the interface circuitry between the PPU 11 and the CPU 10 to provide automatic context switching of the CPU while "looking ahead" in time in order to eliminate time consuming dialogue between the PPU 11 and CPU 10. In operation, the CPU 10 executes user programs on a multiprogram basis. The PPU 11 services requests by the programs being executed by the CPU 10 for input and output services. The PPU 11 also schedules the sequence of user programs operated upon by the CPU 10.

More particularly, the user programs being executed within the CPU 10 requests I/O service from the PPU 11 by either a "system call and proceed" (SCP) command or a "system call and wait" (SCW) command. The user program within the CPU 10 issues one of these commands by executing an instruction which corresponds to the call. The SCP command is issued by a user program when it is possible for the user program to proceed without waiting for the I/O service to be provided but while it proceeds, the PPU 11 can secure or arrange new data or a new program which will be required by the CPU in future operations. The PPU 11 then provides the I/O service in due course to the CPU 10 for use by the user program. The SCP command is applied by way of the signal path 41 to the PPU 11.

The SCW command is issued by a user program within the CPU 10 when it is not possible for the program to proceed without the provision of the I/O service from the PPU 11. This command is issued via line 42. In accordance with the present invention the PPU 11 constantly analyzes the programs contained within the CPU 10 not currently being executed to determine which of these programs is to be executed next by the CPU 10. After the next program has been selected, the switch flag 44 is set. When the program currently being executed by the CPU 10 reaches a state wherein SCW request is issued by the CPU 10, the SCW command is applied to line 42 to apply a perform context switch signal on line 45.

More particularly, a switch flag unit 44 will have enabled the switch 43 so that an indication of the next program to be executed is automatically fed via line 45 to the CPU 10. This enables the next program or program segment to be automatically picked up and executed by the CPU 10 without delay generally experienced by interrogation by the PPU 11 and a subsequent answer by the PPU 11 to the CPU 10. If, for some reason, the PPU 11 has not yet provided the next program description, the switch flag 44 will not have been set and the context switch would be inhibited. In this event, the user program within the CPU 10 that issued the SCW call would still be in the user processor but would be in an inactive state waiting for the context switching to occur. When context switching does occur, the switch flag 44 will be reset.

The look ahead capability provided by the PPU 11 regarding the user program within the CPU 10 not currently being executed enables context switching to be automatically performed without any requirement for dialog between the CPU 10 and the PPU 11. The overhead for the CPU 10 is dramatically reduced by this means, eliminating the usual computer dialog.

FIG. 4

Figure 4:
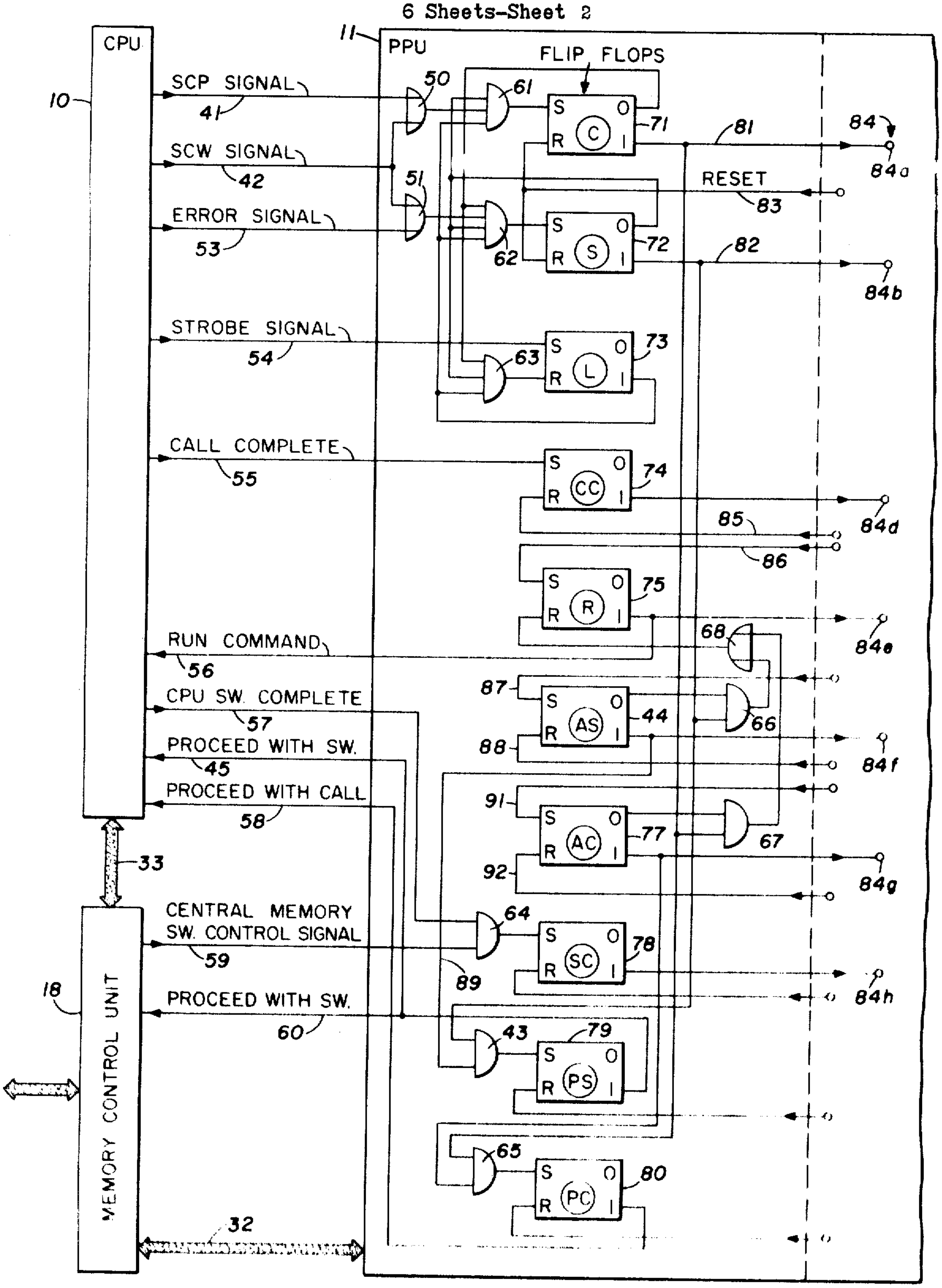
FIG. 4 is a more detailed diagram of the switching system of FIG. 3.

Having described the context switching arrangement between the central processing unit 10 and the peripheral processing unit 11 in a general way, reference should now be had to FIG. 4 wherein a more detailed circuit has been illustrated to show further details of the context switching control arrangement.

In FIG. 4, the CPU 10, the PPU 11 and the memory control unit 18 have been illustrated in a functional relationship. The CPU 10 produces a signal on line 41. This signal is produced by the CPU 10 when, in the course of execution of a given program, it reaches a SCP instruction. Such a signal then appears on line 41 and is applied to an OR gate 50.

The CPU may be programmed to produce an SCW signal which appears on line 42. Line 42 is connected to the second input of OR gate 50 as well as to the first input of an OR gate 51.

A line 53 extends from CPU 10 to the second input of OR gate 51. Line 53 will provide an error signal in response to a given operation of the CPU 10 in which the presence of an error is such as to dictate a change in the operation of the CPU. Such change may be, for example, switching the CPU from execution of a current program to a succeeding program.

On line 54, a strobe signal may appear from the CPU 10. The strobe signal appears as a voltage state which is turned on by the CPU after any one of the signals appear on lines 41, 42 or 53.

The presence of a signal on either line 41 or 42 serves as a request to the PPU 11 to enable the CPU 10 to transfer a given code from the program then under execution in the CPU 10 into the memory through the memory control unit 18 as by way of path 33. The purpose is to store a code in one cell reserved in central memory 12—15 (FIG. 1) for such interval as is required for the PPU 11 to interrogate that cell and then carry out a set of instructions dependent upon the code stored in the cell. In the present system, a single word location is reserved in memory 12—15 for use by the system in the context switching and control operation. The signal appearing on line 55 serves to indicate to the PPU 11 that a sequence, initiated by either an SCP signal on line 41 or an SCW signal on line 42, has been completed.

On line 56 a run command, a signal is applied from the PPU 11 to the CPU 10 and, as will hereinafter be noted, is employed as a means for stopping the operation of the CPU 10 when certain conditions in the PPU 11 exist.

A signal appears on line 57 which is produced by the CPU in response to a SCW signal on line 42 or an error signal on line 53. The PPU 11 initiates a series of operations in which the CPU 10, having reached a point in its operation where it cannot proceed further, is caused to transfer to memory a code representative of the total status of the CPU 10 at the time it terminates its operation on that program. Further, after such storage, an entirely new status is switched into CPU 10 so that it can proceed with the execution of a new program. The new program begins at the status represented by the code switched thereinto. When such a signal appears on line 57, the PPU 11 is so conditioned as to permit response to the succeeding signal on lines 41, 42 or 53. As will be shown, the PPU 11 then monitors the state appearing on line 57 and in response to a given state thereon will then initialize the next succeeding program and data to be utilized by the CPU 10 when an SCW signal or an error signal next appear on lines 42 and 53 respectively.

Line 45, shown in FIGS. 3 and 4, provides an indication to the CPU 10 that it may proceed with the command to switch from one program to another.

The signal on line 58 indicates to the CPU 10 that the selected reserved memory cell is available for use in connection with the issuance of an SCP or an SCW.

The signal on line 59 indicates that insofar as the memory control unit is concerned the switch command has been completed so that coincidence of signals on lines 57 and 59 will enable the PPU 11 to prepare for the next CPU status change. The signal on line 60 provides the same signal as appeared on line 45 but applies it to memory control unit 18 to permit unit 18 to proceed with the execution of the switch command.

It will be noted that the bus 32 and the bus 33 of FIG. 4 are both multiword channels, capable of transmitting eight words or 256 bits simultaneously.

It will also be seen in FIG. 4 that the switching components responsive to the signals on lines 41, 42 and 53—60 are physically located within and form an interface section of the PPU 11. The switching circuits include the OR gates 50 and 51. In addition, AND gates 61—67, AND gate 43, and OR gate 68 are included. In addition, 10 flip-flop storage units 71—75, 77—80 and 44 are included.

The OR gate 50 is connected at its output to one input of the AND gate 61. The output of AND gate 61 is connected to the set terminal of unit 71. The O-output of unit 71 is connected to a second input of the AND gate 61 and to an input of AND gates 62 and 63.

The output of OR gate 51 is connected to the second input of AND gate 62, the output of which is connected to the set terminal of unit 72. The O-output of unit 72 is connected to one input of each of AND gates 61—63. The strobe signal on line 54 is applied to the set terminal of unit 73. The 1-output of unit 73 is connected to an input of each of the AND gates 61—63.

The function of the units 50, 51, 61—63 and 71—73 is to permit the establishment of a code on an output line 81 when a call is to be executed and to establish a code on line 82 if a switching function is to be executed. Initially such a state is enabled by the strobe signal on line 54 which supplies an input to each of the AND gates 61—63. A call state will appear on line 81 only if the previous states of C-unit 71 and S-unit 72 are zero. Similarly, a switching state will appear on line 82 only if the previous states of units 71 and 72 were zero.

It will be noted that a reset line 83 is connected to units 71 and 72 the same being controlled by the program for the PPU 11. The units 71 and 72 will be reset after the call or switch functions have been completed.

It will be noted that the lines 81 and 82 extend to terminals **84*a* and 84*b* of a set of terminals 84 which are program accessible. Similarly, 1-output lines from units 74, 75, 44, 77 and 78 extend to program accessible terminals. While all of the units 71—75, 77—80 and 44** are program accessible, those which are significant so far as the operation under discussion is concerned in connection with context switching have been shown.

Line 55 is connected to the set terminal of unit 74. This records or stores a code representing the fact that a call has been completed. After the PPU 11 determines or recognizes such fact indicated at terminal **84*d*, then a reset signal is applied by way of line 85**.

A program insertion line 86 extends to the set terminal of unit 75. The 1-output of unit 75 provides a signal on line 56 and extends to a program interrogation terminal **84*e*. It will be noted that unit 75 is to be reset automatically by the output of the OR gate 68. Thus, it is necessary that the PPU 11 be able to determine the state of unit 75**.

Unit 44 is connected at its reset terminal to program insertion line 88. The O-output of unit 44 is connected to an input of an AND gate 66. The 1-output of unit 44 is connected to an interrogation terminal **84*f*, and by way of line 89, to one input of AND gate 43. The output of AND gate 66 is connected to an input of OR gate 68. The second input of OR gate 68 is supplied by way of AND gate 67. An input of AND gate 67 is supplied by the O-output of unit 77. The second input of AND gate 67 is supplied by way of line 81 from unit 71. The set input of unit 77 is supplied by way of insertion line 91. The reset terminal is supplied by way of line 92. The function of the units 44 and 77 and their associated circuitry is to permit the program in the PPU 11 to determine which of the functions, call or switch, as set in units 71 and 72**, are to be performed and which are to be inhibited.

The unit 78 is provided to permit the PPU 11 to interrogate and determine when a switch operation has been completed. The unit 79 supplies the command on lines 45 and 60 which indicates to the CPU 10 and the memory control unit 18, respectively, that they should proceed with execution of a switch command. Unit 80 provides a signal on line 58 to instruct CPU 10 to proceed with the execution of a call command only when units 71 and 77 have 1-outputs energized.

The foregoing thus illustrates the manner in which switching from one program to another in the CPU 10 is carried out automatically in dependence upon the status of conditions within the CPU 10 and in dependence upon the control exercised by the PPU 11. This operation is termed context switching and may be further delineated by Table I below which describes the operations, above-discussed, in equation form.

The salient characteristics of an interface between the CPU 10 and PPU 11 for accommodating the SCW and SCP and error context switching environment are:

a. A CPU request is classified as either 1. an error stimulated request for context switch,
2. an SCP, or
3. an SCW.

b. One CPU request is processed at a time.

c. Context switching and/or call completion is automatic, without requiring PPU intervention, through the use of separate flags for "call" and "switch."

d. One memory cell is used for the SCP and SCW communication.

e. Separate completion signals are provided for the "call" and "switch" of an SCW so that the "call" can be processed prior to completion of "switch."

f. A CPU run/wait control is provided.

g. Interrupt for PPU when automatically controlled CPU requests have been completed. This interrupt may be masked off.

Ten CR bits, i.e.: bits in one or more words in the communication register 431, FIG. 11, later to be described, are used for this interface. They are as follows in terms of the symbols shown in FIG. 4:

TABLE I

| | |
|---|---|
| C…… | Monitor "call" request storage (request signal c'). |
| S…… | Context switch request storage (request signal s'). |
| L…… | C, S load request/reply storage (request signal l'):<br>Set $C=L\,\bar{C}\,\bar{S}\,c'$ } reset by PPU at end of request processing.<br>Set $S=L\,\bar{C}\,\bar{S}\,s'$ }<br>Set $L=l'$.<br>Reset $L=\bar{C}\,\bar{S}\,L$. |
| AS…… | Automatic context switching flag:<br>Set AS: by PPU when automatic context switching is to be permitted.<br>Reset AS: by PPU when automatic context switching is not to be permitted. |
| AC…… | Automatic call processing flag:<br>Set AC: by PPU when automatic call processing is to be permitted.<br>Reset AC: by PPU when automatic call processing is not to be permitted. |

Table I – Continued

R..... CPU run flag:
Set R: by PPU when it is desired that the CPU run.
Reset $R=\overline{AS}\cdot S+\overline{AC}\cdot C$.

CO..... Call complete storage (complete signal cc'):
Set $CC=cc'$.
Reset CC: by PPU when C and S are reset.

SC..... Switch complete storage {CPU complete signal: PSC / MCU complete signal: MCS
Set $SC=PSC\cdot MSC$.
Reset SC: by PPU when C and S are reset.

PS..... Proceed command to CPU to initiate context switching:
Set $PS=AS\cdot S$.
Reset PS: by PPU when C and S are reset.

PC..... Proceed command to CPU to initiate use of memory call:
Set $PC=AC\cdot C$.
Reset PC: by PPU when C and S are reset.

Further to illustrate the automatic context switching operations, Tables II and III portray two representative samples of operation, setting out in each case the options of call only, switch only, or call and switch.

TABLE II.—AUTOMATIC CONTEXT SWITCHING AND CALL PROCESSING, CONTINUOUS CPU RUNNING

| Time | | | | AC | AS | PC | PS | R | L | CC | SC | C | S | Flip flop (FIGURE 4) | | |
|---|---|---|---|---|---|---|---|---|---|---|---|---|---|---|---|---|
| i--- | | | | 1 | 1 | 0 | 0 | 1 | 0 | 0 | 0 | 0 | 0 | | | |
| ii--- | | | | 1 | 1 | 0 | 0 | 1 | 1 | 0 | 0 | 0 | 0 | | | |
| iii--- | 1100 | 1000 | 01 | 1 | 1 | 0 | 0 | 1 | 0 | 0 | 0 | 1 | 0 | 1100 | 1000 | 11 |
| iv--- | 1101 | 1000 | 01 | 1 | 1 | 1 | 0 | 1 | 0 | 0 | 0 | 1 | 0 | 1111 | 1000 | 11 |
| v--- | | .... | | 1 | 1 | 1 | 0 | 1 | 0 | 1 | 0 | 1 | 0 | 1111 | 1010 | 11 |
| vi--- | 1101 | 1001 | 01 | | | | | . | . | . | . | | | 1111 | 1011 | 11 |

PPU re-initializes where, during time—
i=Waiting for CPU request
ii=CPU strobe signal received
iii=Request code loaded
iv=Begin procedure
v=Call complete
vi=Switch complete.

TABLE III.—AUTOMATIC CALL PROCESSING, AUTOMATIC CONTEXT SWITCHING DISABLED, CPU RUNNING UNTIL CONTEXT SWITCHING OCCURS

| Time | | | | AC | AS | PC | PS | R | L | CC | SC | C | S | Flip flop (FIGURE 4) | | |
|---|---|---|---|---|---|---|---|---|---|---|---|---|---|---|---|---|
| i--- | | | | 1 | 0 | 0 | 0 | 1 | 0 | 0 | 0 | 0 | 0 | | | |
| ii--- | | | | 1 | 0 | 0 | 0 | 1 | 1 | 0 | 0 | 0 | 0 | | | |
| iii--- | 1000 | 1000 | 01 | 1 | 0 | 0 | 0 | 1 | 0 | 0 | 0 | 1 | 0 | 1000 | 1000 | 11 |
| | PPU | Note | A | | | | | | | | | | | PPU | Note | B |
| iv--- | 1001 | 0000 | 01 | 1 | 0 | 1 | 0 | 1 | 0 | 0 | 0 | 1 | 0 | 1011 | 0000 | 11 |
| v--- | | .... | | 1 | 0 | 1 | 0 | 1 | 0 | 1 | 0 | 1 | 0 | 1011 | 0010 | 11 |
| vi--- | 1001 | 0001 | 01 | | | | | . | . | . | . | | | 1011 | 0011 | 11 |

PPU re-initializes where, during time—
i=waiting for CPU request
ii=CPU strobe signal received
iii=request code loaded
iv=begin procedure
v=call complete
vi=switch complete.

NOTE A: The PPU initiates the context switching by setting PS to 1.
NOTE B: PC will be set to 1 automatically, for this case. This will allow "call" to process automatically. However, the PPU must initiate "switch" by setting PS to 1.

FIG. 5

One of the basic aims of the computer system in which this invention is involved is to be able to perform not only scalar operations but also to optimize the system in the matter of streaming vector data into and out of the arithmetic unit for performing specified vector operations.

A typical vector operation is to ADD $A+B=C$, where $A$, $B$ and $C$ are one-dimensional linear arrays. At the element level, $a_i+b_i=c$. The vectors $A$ and $B$ are streamed through the arithmetic unit and the corresponding elements are added to produce the output vector, $C$.

Another desired operation in that machine is DOT $A\cdot B$ which produces a scalar result, $C$. The result is $$c=\sum_{i=1}^{n} a_i b_i$$

The basic idea of a DOT instruction can be extended to include matrix multiplication. Given two matrices, $A$ an $B$. The multiplication is:

$$\underset{A}{\begin{bmatrix} a_{11} & a_{12} & a_{13} \\ a_{21} & a_{22} & a_{23} \\ a_{31} & a_{32} & a_{33} \end{bmatrix}} \cdot \underset{B}{\begin{bmatrix} b_{11} & b_{12} & b_{13} \\ b_{21} & b_{22} & b_{23} \\ b_{31} & b_{32} & b_{33} \end{bmatrix}} = \underset{C}{\begin{bmatrix} c_{11} & c_{12} & 13 \\ c_{21} & c_{22} & 23 \\ c_{31} & c_{32} & 33 \end{bmatrix}}$$

$$c_{11}\sum_{i=1}^{3}=(a_{1,i})\cdot(b_{i,1}) \qquad c_{12}=\sum_{i=1}^{3}(a_{1,i})\cdot(b_{i,2}) \qquad c_{13}=\sum_{i=1}^{3}(a_{1,i})\cdot(b_{i,3})$$

where $$c_{11}=[a_{11}\ a_{12}\ a_{13}]\begin{bmatrix} b_{11} \\ b_{21} \\ b_{31} \end{bmatrix}=a_{11}b_{11}+a_{12}b_{21}+a_{13}b_{31}$$

or, more generally, $$c_{ij}=\sum_{k=1}^{p} a_{ik}b_{kj}$$

where $p$ is the order of the matrices.

The generation of element $c_{11}$ may be described as multiplying the first row (row 1) of matrix $A$ by the first column (column 1) of matrix $B$. Element $c_{12}$ may be generated by multiplying row 1 of matrix $A$ by column 2 of matrix $B$. Element $c_{13}$ may be generated by multiplying row 1 of matrix $A$ by column 3 of matrix $B$.

In the vector sense, row vector 1 of matrix $A$ is used as an operand vector for three vector operations involving column vectors 1, 2 and 3, respectively, of matrix $B$ to generate row vector 1 of matrix $C$. . This entire process may then be repeated twice using, first, row vector 2 of matrix $A$ and second, row vector 3 of matrix $A$ to generate row vectors 2 and 3 of matrix $C$.

The basic DOT vector instruction can be used within a nest of two loops to perform the matrix multiplication. These loops may be labeled as inner and outer loops. In the example of matrix multiplication, the inner loop would be invoked to index from element to element of a row in matrix *C*. The outer loop would be invoked to index from row to row in matrix *C*.

The operations diagrammatically shown in FIG. 5 and described in connection with FIG. 5 are accommodated and optimized in a CPU structured as shown in FIG. 6.

FIG. 6

In the computer described herein, the CPU 10 has the capability of processing data at a rate which substantially exceeds the rate at which data can be fetched from and stored in memory. Therefore, in order to accommodate the memory system and its operation to take advantage of the maximum speed capable in the CPU 10 for treatment of large sets of well ordered data, as in vector operations, a particular form of interfacing is provided between the memory and the AU together with compatible control. The system employs a memory buffer unit schematically illustrated in FIG. 6 where the memory stacks are connected through the central memory control unit 18 to the CPU 10. The CPU 10 includes a memory buffer unit 100 and a vector arithmetic unit 101. The channel 33 interconnects the memory control 18 with CPU 10, particularly with the buffer unit 100. Three lines, **110*a*, 100*b* and 100*c* serve to connect the memory buffer unit 100 to the arithmetic unit 101. The lines 100*a* an 100*b* serve to apply operands to the unit 101. The line 100*c* serves to return the result of the operations in the unit 101 to the memory buffer unit and thence through memory control to the central memory stacks 12—15**.

FIG. 7

FIG. illustrates in greater detail and in a functional sense the nature of the memory buffer unit employed for high speed communication to and from the arithmetic unit.

As previously described, memory storage in the present system is in blocks of 256 bits with eight 32-bit words per block. Such data words are then accessed from memory by way of the central memory control 18 and thence by way of channel 33 to a memory bus gating unit **18*a*. As above-mentioned, the memory buffer unit 100 is structured in three channels. The first channel includes buffer units 102 and 103 in series between the gating unit 18A and the input/output bus 104 for the AU 101. Similarly, the second channel includes buffer units 105, 106 and the third channel includes units 107 and 108. The first and second channels provide paths for operands delivered to the AU 101 and the buffer units 107 108**. The third channel provides for transmittal of the results to the central memory unit.

The buffer unit 102 is constructed to receive and store groups of eight words at a time One group is received for each eight clock pulses. Each group is transferred to buffer unit 103 in synchronism with buffer 102. Words of 32 bits are transferred from buffer unit 103 to the AU 101 one word at a time, one word for each clock pulse. It will be recognized that, depending upon the nature of the operation carried out by the unit 101, one result may be transferred via buffers 108 and 107 to memory for each clock pulse. The system is capable of such high utilization operations as well as operations at less demanding rates. An example of the maximum demand on the buffering operation and the arithmetic unit would be a vector addition where two operands would be applied to the arithmetic unit 101 from units 103 and 106 for each clock pulse and one sum would be applied from the arithmetic unit 101 to the buffer unit 108 for each clock pulse.

The system of FIG. 7 also includes a file of addressable registers including base registers 120, 121, general registers 122, 123 and index register 124 and a vector parameter file 125. Each of the registers 120—125 is accessible to the arithmetic unit 101 by way of the bus 104 and the operand store and fetch unit 126. An arithmetic control unit 127 is also provided to be responsive to an instruction buffer unit **127*a*. An index unit 126*a* operates in conjunction with the instruction buffer unit 127*a* on instructions received from unit 128. Instruction files 129 and 130 provide paths for flow of instructions from central memory to the instruction fetch unit 128**.

A status storage and retrieval gating unit 131 is provided with access to and from all of the units in FIG. 7 except the instruction files 129 and 130. It also communicates with the memory bus gating unit 18A. It is the operation of the status storage and retrieval gating unit 131 that, in response to an SCW on line 42 or an error signal on line 53, FIG. 4, causes the status of the entire CPU 10 to be transferred to memory and a new status introduced into the CPU 10 for initiation of operations under a new program.

A memory buffer control storage file is provided in the memory buffer unit 100. The file includes a parameter register file 132 and a working storage register file 133. The parameter file is connected by way of a channel 134 and bus 104 to the vector parameter file 125. The contents of the vector parameter file are transferred into the memory buffer control storage file 132 in response to fetching of a generic vector instruction from memory into unit 128. By way of illustration, assume the acquisition of such a generic vector instruction by unit 128. A transfer is immediately carried out, in machine language, transferring the parameters from the file 125 to the file 132.

The operations then being executed in the subsequent stages **126*a*, 127*a* and 126, 127 of the CPU 10, in effect are pipelined. More particularly, during the interval that the AU 101 is performing a given operation, the units 126 and 127 prepare for the next succeeding operation to be carried out by AU 101. During the same time interval, the units 126*a* and 127*a* are preparing for the next succeeding operation to be carried out by units 126 aNd 127. During this same interval, the instruction fetch unit 128 is fetching the next instruction. This is the instruction to be executed three operations later by the AU 101. Thus, in this effective pipeline structure, there are four instructions under process simultaneously, one at each of levels $T_1$, $T_2$, $T_3$ and $T_4$, FIG. 7**.

It will be noted that the combination of the vector parameter file 125 and the memory buffer control storage file 132 provide capability for specifying complex vector operations at the machine language level, under program control.

The operation of the parameter file 132 and the working storage file 133 may further be understood when it is understood that the legends employed in files 132 and 133, FIG. 7, are as in Table IV.

TABLE IV

Parameter File 132

| | |
|---|---|
| SA: | starting address in central memory for reading vector *A* |
| SB: | starting address in central memory for reading vector *B* |
| SC: | starting address in central memory for storing vector *C* |
| NV: | number of elements in fundamental vector operation |
| NI: | number of turns of inner loop |
| NΦ: | number of turns of outer loop |
| ΔI: | address increment for inner loop |
| ΔΦ: | address in increment for outer loop |

Working File 133 for vectors *A*, *B* and *C*

| | |
|---|---|
| AA: | current address for vector *A* |
| BB: | current address for vector *B* |
| CC: | current address for vector *C* |

Working File 133 for current index count for the vector length, inner loop and outer loop

VC: vector count
IC: Inner loop count
ΦC: outer loop count

The parameters are loaded into the registers from central memory prior to executing a vector instruction. The vectors are streamed through the arithmetic unit, consistent with the parametric description thus established in the CPU 10.

A matrix multiplication example of the above equation will now be described in more detail, the memory locations being as tabulated in Table V.

TABLE V

| Location | | Location | | Location | |
|---|---|---|---|---|---|
| $k$ | $a_{11}$ | $l$ | $b_{11}$ | $m$ | $c_{11}$ |
| $k+1$ | $a_{12}$ | $l+1$ | $b_{21}$ | $m+1$ | $c_{12}$ |
| $k+2$ | $a_{13}$ | $l+2$ | $b_{31}$ | $m+2$ | $c_{13}$ |
| $k+3$ | $a_{21}$ | $l+3$ | $b_{12}$ | $m+3$ | $c_{21}$ |
| $k+4$ | $a_{22}$ | $l+4$ | $b_{22}$ | $m+4$ | $c_{22}$ |
| $k+5$ | $a_{23}$ | $l+5$ | $b_{32}$ | $m+5$ | $c_{23}$ |
| $k+6$ | $a_{31}$ | $l+6$ | $b_{13}$ | $m+6$ | $c_{31}$ |
| $k+7$ | $a_{32}$ | $l+7$ | $b_{23}$ | $m+7$ | $c_{32}$ |
| $k+8$ | $a_{33}$ | $l+8$ | $b_{33}$ | $m+8$ | $c_{33}$ |

Matrix $A$ is assumed to be prestored at locations $k$ through $k+8$ by rows. Matrix $B$ is assumed to be prestored at locations $l$ through $l+8$ by columns. Matrix $C$ is to be stored at locations $m$ through $m+8$ by rows. These allocations are presented in Table V.

Initially: SA=$k$; SB=$l$; SC=$m$; NV=3; NI=3; Nθ=3; 1Δ=1; Δθ=3.

The sequence of addresses and the method of computation for vector A is presented in TABLE VI.

TABLE VI

| Step | Operations | VC | IC | θC | A address |
|---|---|---|---|---|---|
| 1 | SA→AA; NV−1→VC; NI−1→IC; Nθ−1→θC | 2 | 2 | 2 | $k$ |
| 2 | AA+1→AA; VC−1→VC | 1 | 2 | 2 | $k+1$ |
| 3 | AA+1→AA; VC−1→VC | 0 | 2 | 2 | $k+2$ |
| 4 | SA→AA; NV−1→VC; IC−1→IC | 2 | 1 | 2 | $k$ |
| 5 | AA+1→AA; VC−1→VC | 1 | 1 | 2 | $k+1$ |
| 6 | AA+1→AA; VC−1→VC | 0 | 1 | 2 | $k+2$ |
| 7 | SA→AA; NV−1→VC; IC−1→IC | 2 | 0 | 2 | $k$ |
| 8 | AA+1→AA; VC−1→VC | 1 | 0 | 2 | $k+1$ |
| 9 | AA+1→AA; VC−1→VC | 0 | 0 | 2 | $k+2$ |
| 10 | SA+Δθ→AA, SA; NV−1→VC; NI−1→IC; θC−1→θC | 2 | 2 | 1 | $k+3$ |
| 11 | AA+1→AA; VC−1→VC | 1 | 2 | 1 | $k+4$ |
| 12 | AA+1→AA; VC−1→VC | 0 | 2 | 1 | $k+5$ |
| 13 | SA→AA; NV−A→VC; IC−1→IC | 2 | 1 | 1 | $k+3$ |
| 14 | AA+1→AA; VC−1→VC | 1 | 1 | 1 | $k+4$ |
| 15 | AA+1→AA; VC−1→VC | 0 | 1 | 1 | $k+5$ |
| 16 | SA→AA; NV−1→VC; IC−1→IC | 2 | 0 | 1 | $k+3$ |
| 17 | AA+1→AA; VC−1→VC | 1 | 0 | 1 | $k+4$ |
| 18 | AA+1→AA; VC−1→VC | 0 | 0 | 1 | $k+5$ |
| 19 | SA+Δϕ→AA, SA; NV−1→VC; NI−1→IC; ϕC−1→ϕC | 2 | 2 | 0 | $k+6$ |
| 20 | AA+1→AA; VC−1→VC | 1 | 2 | 0 | $k+7$ |
| 21 | AA+1→AA; VC−1→VC | 0 | 2 | 0 | $k+8$ |
| 22 | SA→AA; NV−1→VC; IC−1→IC | 2 | 1 | 0 | $k+6$ |
| 23 | AA+1→AA; VC−1→VC | 1 | 1 | 0 | $k+7$ |
| 24 | AA+1→AA; VC−1→VC | 0 | 1 | 0 | $k+8$ |
| 25 | SA→AA; NV−1→VC; IC−1→IC | 2 | 0 | 0 | $k+6$ |
| 26 | AA+1→AA; VC−1→VC | 1 | 0 | 0 | $k+7$ |
| 27 | AA+1→AA; VC−1→VC | 0 | 0 | 0 | $k-8$ |

A similar procedure is followed for vectors $B$ and $C$. The vector $B$ address sequence is similar to the address sequence for vector $A$ except that $l$ is the starting address instead of $k$. The vector $C$ sequence is $m$, $m+1$,...$m+8$.

The manner in which the sequence is generated is dictated by the particular vector instruction being executed. The example given is for the DOT instruction. The vector code is presented to the memory buffer unit for use in this determination.

FIG. 8

Having described above the provisions of the present system for supplying ordered data at a high rate, it will be recognized that it is desirable to provide an arithmetic unit (AU) that is constructed and oriented to handle the data at the rates made possible by means of the buffering system described and illustrated in FIGS. 6 and 7.

The system shown in FIG. 8 is an arithmetic unit formed of specialized units and capable of being selectively placed in different pipeline configurations within the AU 101. The AU 101 is partitioned into parts which are harmonious and consistent with the functions they perform, and each functional unit in the AU 101 is provided with its own storage. A multiplier included in the AU 101 is of a type to permit production of a product for each timing pulse. In AU 101, the delays generally involved in multiplication where iterative procedures are employed are avoided.

The AU 101 comprises two parallel pipes 300A and 300B. The pipes are on opposite sides of a central boundary 300. Lines **300*a*, 300*b*, 300*c* and 300*d*** represent the operand input channels.

The AU pipeline 300A includes an exponent subtract unit 302 connected in series via line 303 with an alignment unit 304. Alignment unit 304 is connected via line 305 to an add unit 306 which in turn is connected via line 307 to a normalizing unit 308. A line 309 connects the output of the normalizing unit 308 to an output unit 310.

The operand channels **300*a* and 300*c* also are connected to a prenormalizing unit 311 and thence to a multiplier 312 whose output is connected to one input of the add unit 306 via line 313. An accumulator 314 is connected by a first input line 315 leading from the output of the alignment unit 304, by a second input line 316 leading from an output of the add unit 306 and by a line 317 leading from the pipeline section 300B. The accumulator 314 has a first output line 318 leading to one input of the exponent subtract unit 302. A second output line 319 leads to the output unit 310**.

The exponent subtract unit 302 is connected by way of line 320 to the input of output unit 310. In a similar manner, th outputs of the alignment unit 304 and the add unit 306 ar connected to line 320. The add unit 306 is connected by way of line 321 to a fourth input to the exponent subtract unit 302. In addition to the input to the addition unit 306 from alignment unit 304 and from the multiplier 312, a third input from section 300B is provided by way of line 322.

An important aspect of the AU 101 is that the operand channels **300*a* and 300*c* are connected via lines 323 and 324 to each of the units in the pipeline section 300A except for the accumulator 314. More particularly, lines 323 and 324 are connected to the input of the multiplier 312 via lines 325. Similarly, lines 326 connect the operands to the alignment unit 304. Further, the operands on channels 300*a* and 300*c* are directly fed to the input of the addition unit 306 via leads 327 and to the input of the normalizer unit 308 via leads 328. Lines 323 and 324 directly feed the operands into the output unit 310**. Control gating under machine or program instructions serves to structure the pipelines.

In section 300B, lines **300*b* and 300*d* are fed to an exponent subtract unit 330 which is connected via a line 331 to the input of an alignment unit 322, which in turn is connected via line 333 to the input of an add unit 334. The output of the add unit 334 is connected via a line 335 to a normalizing unit 336 whose output is fed via line 337 to an output unit 338. The operands on channels 300*b* and 300*d* are also fed to the input of a prenormalizing unit 340 whose output is directly connected to a multiplier 341. Additionally, each of the channels 300*b* and 300*d* are connected via lines 342 and 343 to the alignment unit 332, the multiplier 341, the add unit 334, the normalizing unit 336 and the output unit 338**.

The output of the addition unit 334 is connected via a line 344 to the input of an accumulation unit 345. Additionally, the output of the alignment unit 332 is connected via line 346 to an input of the accumulator unit 345. Accumulator unit 345 provides an output connected via line 317 to the accumulator unit 314 located in the pipeline section 300A. Further, the output of the accumulator 345 is connected via a line 347 to the output unit 338.

A third output from the accumulator 345 is fed via a line 348 to another input of the exponent subtract unit 330. One output of the exponent subtract unit 330 is fed via a line 350 to the exponent subtract unit 302 located in the pipeline section 300A.

The output from the exponent subtract unit 330 provided on line 331 is also fed via a line 351 to the output unit 338. Similarly, the outputs of the alignment unit 332, the add unit 334, are fed via the line 351 to the output unit 338. An output from the add unit 334 is also fed via a line 352 to an input of the exponent subtract unit 330. An output from the multiplier unit 341 is fed via a line 353 to a second input of the add unit 334 and also to an input of the add unit 306 located in the pipeline section 300A. The output unit 338 is connected by a line 355 to the output unit 310 located in the pipeline section 300A.

The present AU 101 thus provides a plurality of special purpose units each of which is capable of performing a different arithmetic operation on operand inputs. AU 101 has a broad capability in that selected ones of the special purpose units therein may be connected to perform a variety of different arithmetic functions in response to an instruction program. Once connected in the preselected configuration, operand signals are sequentially fed through the connections such that the selected ones of the special purpose unit simultaneously operate upon different operand signals during each clock period. This manner of operation, termed pipelining, provides fast and efficient operation on streams of data.

In operation, and to illustrate the most demanding operation of the pipeline, it is noted that there are four distinct functional steps which constitute floating-point addition: exponent subtraction, fraction alignment, fraction addition, post-normalization. These steps are illustrated in TABLE VII.

TABLE VII

| | $t_0$ | $t_1$ | $t_2$ | $t_3$ | $t_4$ |
|---|---|---|---|---|---|
| Exponent subtraction | | $a_1b_1$ | $a_2b_2$ | $a_3b_3$ | $a_4b_4$ |
| Fraction alignment | | | $a_1, b_1$ | $a_2, b_2$ | $a_3, b_3$ |
| Fraction addition | | | | $a_1, b_1$ | $a_2, b_2$ |
| Postnormalization | | | | | $a_1, b_1$ |

In the addition of two strings of numbers, or vectors, beginning at time $t_0$, each section of the adder will be vacant. At time $t_1$, the first pair of numbers, $a_1$ and $b_1$, are undergoing the initial step of exponent subtraction At time $t_2$, the second pair of numbers, $a_2$ and $b_2$, are undergoing exponent subtraction. The first pair of numbers $a_1$ and $b_1$ have progressed on to the next step, fraction alignment. This process continues such that when the "pipe" is full at time $t_4$, each section is processing one pair of numbers.

It will be recognized that the AU 101 is basically 64-bit oriented. AU subunits in FIG. 8 other than the multiply units 312 and 341 input and output 32 bits of data whereas the multiply units 312 and 341 output 64 bits of data. With the exception of multiply and divide, all functions require the same time for single or double length operands.

Fixed point numbers preferably are represented in two's complement notation while floating point numbers are in sign and magnitude along with an exponent represented by an excess 64 number.

A significant feature of the AU is the pipeline structure which allows efficient processing of vector instructions. The exclusive partitions of pipeline, each provide an output for each clock pulse. Each section may perform parts of other instructions. However, the sections are partitioned as shown to speed up the floating point add time. Each stage of AU 101 other than the multiplier stage contains two sections which may be combined. The sections 302 and 330 form one such stage. The sections may operate independently or may be coupled together to form one double length stage.

The alignment stage 304, 332 is used to perform right shifts in addition to the floating point alignment for add operations. The normalize stage 308—336 is used for all normalization requirements and will also perform left shifts for fixed point operands. The add stage 306—334 preferably employs second level look-ahead operations in performing both fixed and floating point additions. This section is also used to add the pseudosum and carry which is an output of the multiply section.

In processing vectors, floating point addition is desirable in order to accommodate a wide dynamic range. While the AU 101 is capable of both fixed point and floating point addition, the economy in time and operation achieved by the present invention is most dramatically illustrated in connection with the floating point addition, Table VII.

The multiply unit 312 is able to perform a 32 by 32 bit multiplication in one clock time. The multipliers 312 and 341 preferably are of the type described by Wallace in a paper entitled, "A Suggestion for a Fast Multiplier," PGEC (IEEE transactions on Electronic Computers), Vol. EC–13, pages 14—17, (Feb. 1964). Such multipliers permit the execution of a multiplication in a single clock pulse and thus the unit harmonizes with the concept upon which the AU 101 is based.

The multipliers are also the basic operators for the divide instruction. Double length operations for both of these instructions require several iterations through the multiply unit to obtain the result. Fixed point multiplications and single length floating point multiplications are available after only one pass through the multiplier. The output of the multiply unit 312 is two words of 64 bits each, i.e., pseudosum and the pseudocarry, selected bits of which are added in the add section 306 to obtain the product. When a single length multiply is to provide a double length product, the multiplier 341 produces a 64-bit pseudosum and a 64-bit pseudocarry which are then added in stage 306, 334 to produce the double length product. A double length multiply can be performed by pipelining the three following: multiply 341, add stage 306, 334 and accumulator stage 314, 345. The accumulator stage 314, 345 is similar to the add unit and is used for special cases which need to form a running total.

Double length multiply requires such a running total because four separate 32×32 bit multiplications will be performed and then added together in the accumulator in the proper bit positions. A double length multiply therefore requires eight clock times to yield an output while single length would require only four. A double length multiply means that two 64-bit floating point numbers (56 bits of fraction) are multiplied to yield a 64-bit result with the low order bits truncated after post-normalization. A fixed point multiply involves a 32×32 bit multiplication and yields a 64-bit result.

Division is the most complex operation to be performed by this AU 101. Advantage is taken of the fast multiply capabilities and employs iteration which, upon a specified number of multiplications, will form the quotient to the desired accuracy. This operation does not form a remainder as a result of the previous multiplications thus it is necessary to again employ the existing hardware to form a remainder. Assuming $x/y=Q$ was the solution, the remainder can be formed by multiplying $y \cdot Q$ and subtracting from $x$; $R=X-y \cdot Q$. The remainder will be accurate to as many bits as the dividend $X$. The time required to form the remainder is added directly to the time required to obtain the quotient. The divide time for single length increases from 12 clock times to 16 clock times to provide the remainder. The divide algorithm requires that the divisor be normalized, bitwise for fixed point or the most significant hexadecimal digit for floating point be nonzero.

The output stage 310, 338 is used to gather outputs from all other sections and also to do simple transfers, booleans, etc., which will require only one clock time for execution in the AU 101.

Storage is provided at each level of the pipe to provide positive separation of the various elementary problems which may be in processing at a given time. The entire arithmetic unit is synchronous in its operation, utilizing a common clock for timing the logic circuits. For this purpose, storage registers such as register 310a are included in each unit in the pipeline.

FIG. 9

Figure 9:
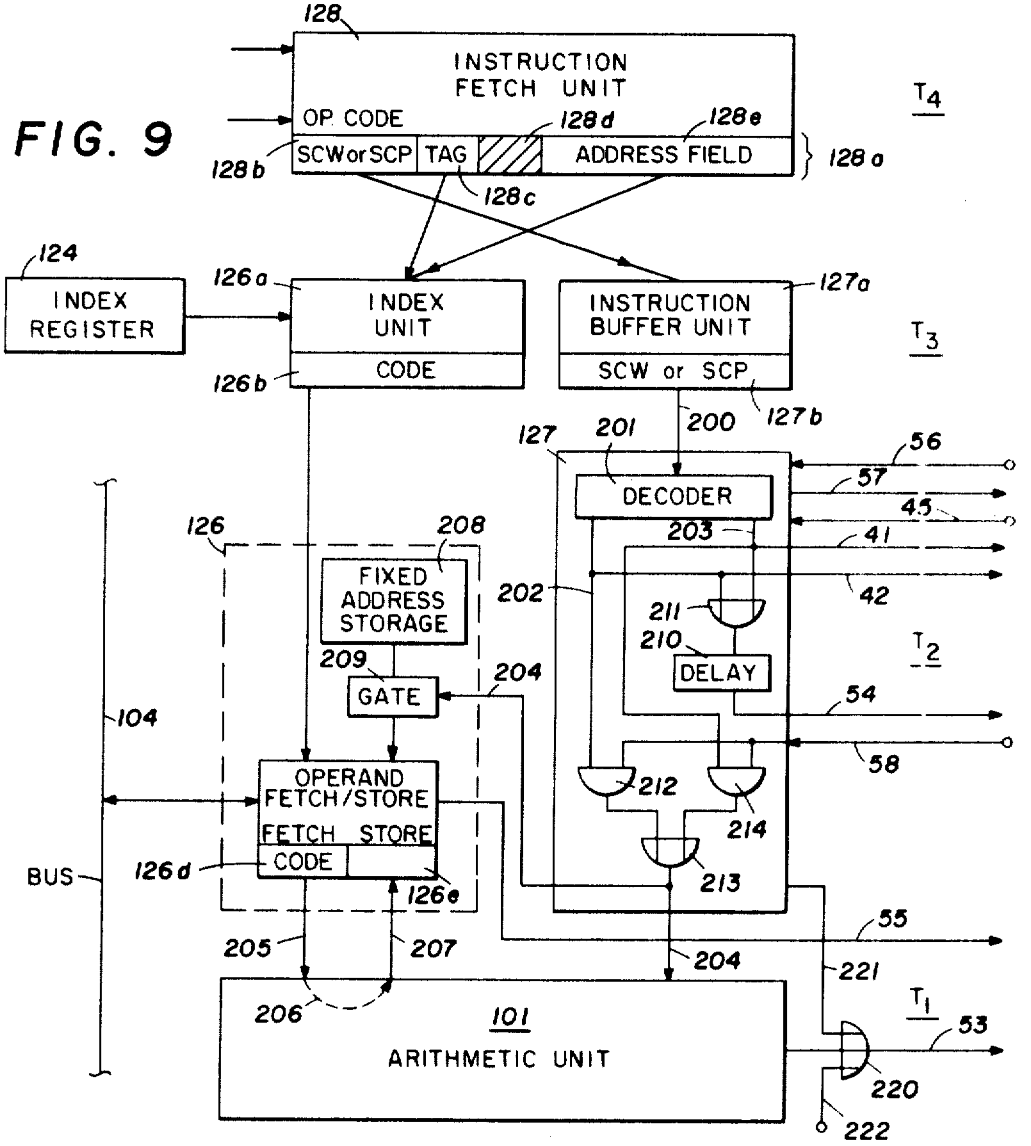
FIG. 9 illustrates elements in the CPU 10 which are employed in context switching described in connection with FIGS. 3—7.

Having described context switching in connection with FIGS. 3 and 4 and further, having described the CPU 10 in connection with FIGS. 5—8, it will be helpful to refer to FIG. 9 wherein the cooperation between the CPU 10, the PPU 11, and the memory control 18 has further been illustrated. FIG. 9 may be taken in conjunction with FIG. 4. FIG. 9 includes a more detailed showing of the contents of the CPU 10 and illustrates the relationship to the channels 41, 42, and 53—58 of FIG. 4.

In FIG. 9 the instruction fetch unit 128 is provided with an output register **128*a*. This register in a preferred form has 32 bits of storage. It is partitioned into a first section 128*b* of eight bits which represents the operation code. It is also provided with a section 128*c* which is an address tag of four bits. Section 128*d* is a 4-bit section normally employed in operation of the arithmetic unit 101 to designate a register which is not involved in the context switching operation and will nor further be described here. Finally, an address field 128*e*** of 16 bits is provided.

In the normal course of operation of the system, the index unit **126*a*, having an output register 126*b*, performs one step of the time sequence T1–T4. In some operations, it produces a word in the output register 126*b* which is representative of the sum of the word in the address field 128*e* and a word from the index register 124 which is designated by the address tag in the section 128*c*. This code is then employed by the store and fetch unit 126 to control the flow of operands to and from the AU 101**.

When the program codes for SCW or SCP appear in the section **128*b*, a different sequence of operations is initiated. First, the 8-bit word in section 128*b* is applied to the buffer unit 127*a* and appears in its output register 127*b*. This 8-bit code is then applied by way of channel 200 to the control unit 127**.

Within the control unit 127 is a decoder 201 which provides an output on line 202 if the 8-bit code represents a SCW command. It produces an output signal on line 203 if the 8-bit code represents a SCP command. Such signals, when present, will appear on the output lines 41 and 42.

As above-explained, if the PPU 11, FIG. 4, senses the presence of a signal on either line 41 or 42, then after a controlled delay interval, a signal will be applied to unit 127 by line 58 which will enable the application of a signal by way of line 204 to the AU 101. The latter signal will then operate to transfer directly to a particular address in memory the code stored in the register **126*d*. This transfer is by way of channel 205 and route 206 within the AU 101, then channel 207 to the register 126*e* and thence, by way of bus 104**, to memory.

The code from register **126*e* will be stored in memory at the address stored in an address register 208. This is an address assigned in memory for this purpose and is not otherwise used. It may be permanently wired into the system. The address is transmitted by actuation of a gate 209 under the control of the signal on line 204**.

The foregoing sequence of operations is first subject to a time delay introduced by operation of delay unit 210 to control the output of unit 127. More particularly, the lines 202 and 203 lead to an OR gate 211 and then to the delay unit 210 to apply a delayed strobe signal to the line 54.

Line 202 is connected by way of an AND gate 212 to an OR gate 213. Line 58 is also connected to the AND gate 212 and to an AND gate 214 which also is connected to the OR gate 213. Line 203 is connected to the second input of AND gate 214.

The state on line 58 normally inhibits any attempt to access the particular memory cell represented by the address in the register 208. However, as above-explained, if the condition of the system as represented by the states on lines 56, 57, 45, 58, 55, 53 are proper, then and only then will the code in register **126*e* be placed in the particular memory cell. Thus, the entire operation of CPU 10 may be interrupted. Alternatively, it may be directed to proceed while initialization or other preparatory operations are started in portions of the system external to the CPU 10. The choice depends upon the appearance in the register 128*a* of a program instruction having a particular code, SCP, SCW, in the operation code section 128*b* of the output register 128*a***.

Line 53, FIGS. 4 and 9, will be energized or so controlled as to apply a signal to the PPU 11 when an error has been detected within the CPU 10. An OR gate 220 has been illustrated as having one input leading from the AU 101 with lead 221 leading to the control unit 127. Such an error signal might appear when an overflow condition occurs in the AU 101. Such an error might also appear if there is an undefined code in the control unit 127. In either event, or in response to other error signals which might be generated and applied to the OR gate 220 by way of line 222, a signal will appear on line 53. The signal on either line 53 or line 42 will cause the CPU 10 to switch from one program to the next program prepared by the PPU 11. Such a change as between programs will occur only if the states in the control shown on FIG. 4 enable such change. When such change is to be made, and as previously described, the status of the CPU 10 is then stored in memory through the operation of the gating unit 131, FIG. 7. Thereafter, the CPU 10 is initialized to start a new program or resume the program previously switched into the CPU 10.

FIG. 10

The foregoing description has dealt with the PPU 11. From the operations above described it will be recognized that the PPU 11 plays a vital role in sustaining the CPU 10 such that it can operate in the manner above-described. The PPU 11 in the present system is able to anticipate the need and supply demands of the CPU 10 and other components of the system generally, by utilization of a particular form of control for time sharing as between a plurality of virtual processors within the PPU 11. More particularly, programs are to be processed by a collection of virtual processors within the PPU 11. Where the programs vary widely, it becomes advantageous to deviate from unpartial time sharing as between the virtual processors.

In the system shown in FIG. 10, some virtual processors may be greatly favored in allocation of processing time within the PPU 11 over other virtual processors. Further, provision is made for changing frequently and drastically the allocation of time as between the processors.

FIG. 10 indicates that the virtual processors $P_0$—$P_7$ in the PPU 11 are serviced by the AU 400 of PPU 11.

The general concept of cooperation on a time sharing sense as between an arithmetic unit such as unit 400 and virtual processors such as processors $P_0$—$P_7$ is known. However, the present system and the means for controlling the same have not heretofore been provided. The processors $P_0$—$P_7$ may in general be of the type illustrated and described in U.S. Pat. No. 3,337,854 to Cray et al. wherein the virtual processors occupy fixed time slots. The construction of the present system provides for variable control of the time allocations in dependence upon the nature of the task confronting the overall computer system.

In FIG. 10 eight virtual processors $P_0$—$P_7$ are employed in PPU 11. The AU 400 of PPU 11 is to be made available to the virtual processors one at a time. More particularly, one virtual processor is channelled to AU 400 with each clock pulse. The selection from among the virtual processors is performed by a sequencer diagrammatically represented by a switch 401. The effect of a clock pulse, represented by a change in position of switch 401, is to actuate the AU 400 which is coupled to the virtual processors in accordance with a code selected for time slots 0—15. Only one virtual processor may be used to the exclusion of all the others, as one extreme. At the other extreme, the virtual processors could share the time slot equally. The system for providing this flexibility is shown in FIGS. 11—13.

FIG. 11

The organization of the PPU 11 is shown in FIG. 11. The central memory 12—15 is coupled to the memory control 18 and then to channel 32. Virtual processors $P_0$—$P_7$ are connected to the AU 400 by means of the bus 402 with the AU 400 communicating back to the virtual processors $P_0$—$P_7$ by way of bus 403. The virtual processors $P_0$—$P_7$ communicate with the internal bus 408 of the PPU 11 by way of channels 410—417. A buffer unit 419 having eight single word buffer registers 420—427 is provided. One register is exclusively assigned to each of the virtual processors $P_0$—$P_7$. The virtual processors $P_0$—$P_7$ are provided with a sequence control unit 418 in which implementation of the switch 401 of FIG. 10 is located. Control unit 418 is driven by clock pulses. The buffer unit 419 is controlled by a buffer control unit 428. A channel 429 extends from the internal bus 408 to the AU 400.

The virtual processors $P_0$—$P_7$ are provided with a fixed read-only memory 430. In the preferred embodiment of the invention, the read-only memory 430 is made up of a prewired diode array for rapid access.

A set of communication registers 431 is provided for communicating between the bus 408, the I/O devices and data channels. In this embodiment of the system, 64 communication registers are provided in unit 431.

The shared elements include the AU 400, the read-only memory (ROM) 430, the file of communication registers (CR) 431, and the single word buffer (SWB) 419 which provides access to central memory (CM) 12—15.

The ROM 430 contains a pool of programs and is not accessed except by reference from the program counters of the virtual processors. The pool includes a skeletal executive program and at least one control program for each I/O device connected to the system. The ROM 430 has an access time of 20 nanoseconds and provides 32 bit instructions to the $P_0$—$P_7$ units. Total program space in ROM is 1024 words. The memory is organized into 256 word modules so that portions of programs can be modified without complete refabrication of the memory.

The I/O device programs may include control functions for the device storage media as well as data transfer functions. Thus, motion of mechanical devices can be controlled directly by the program rather than by highly special purpose hardware for each device type. Variations to a basic program are provided by parameters supplied by the executive program. Such parameters are carried in CM 12—15 or in the accumulator registers of the virtual processor executing the program.

The source of instructions for the virtual processors may be either ROM 430 or CM 12—15. The memory being addressed from the program counter in a virtual processor is controlled by the addressing mode which can be modified by the branch instructions or by clearing the system. Each virtual processor is placed in the ROM mode when the system is cleared.

When a program sequence is obtained from central memory, it is acquired via the buffer 419. Since this is the same buffer used for data transfers to or from CM 12—15, and since central memory access is slower than ROM access, execution time is more favorable when program is obtained from ROM 430.

Time slot zero may be assigned to one of the eight virtual processors by a switch on a maintenance panel. This assignment cannot be controlled by the program. The remaining time slots are initially unassigned. Therefore, only the virtual processor selected by the maintenance panel switch operates at the outset. Furthermore, since program counters in each of $P_0$—$P_7$ are initially cleared, the selected virtual processor begins executing program from address 0 of ROM 430 which contains a starter program. The selection switch on the maintenance panel also controls which one of eight bits in the file 431 is set by a "bootstrap signal" initiated by the operator.

The buffer 419 provides the virtual processors access to CM 12—15. The buffer 419 consists of eight 32-bit data registers, eight 24-bit address registers, and controls. Viewed by a single processor, the buffer 419 appears to be only one memory data register and one memory address register.

At any given time the buffer 149 may contain up to eight memory requests, one for each virtual processor. These requests preferably are processed on a combined basis of fixed priority and first in, first out priority. Preferably four priority levels are established and if two or more requests of equal priority are unprocessed at any time, they are handled first in, first out.

When a request arrives at the buffer 419, it automatically has a priority assignment determined by the memory 12—15 priority file maintained in one of the registers 431. The file is arranged in accordance with virtual processor numbers, and all requests from a particular processor receive the priority encoded in two bits of the priority file. The contents of the file are programmed by the executive program, and the priority code assignment for each virtual processor is a function of the program to be executed. In addition to these two priority bits, a time tag may be employed to resolve the cases of equal priority.

The registers 431 are each of 32 bits. Each register is addressable from the virtual processors, and can also be read or written by the device to which it connects. The registers 431 provide the control and data links to all peripheral equipment including the system console. Some parameters which control system functioning are also stored in the communication registers 431 from where the control is exercised.

FIG. 12

Each cell in register 431 has two sets of inputs as shown in FIG. 12. One set is connected into the PPU 11, and the other set is available for use by the peripheral device. Data from the PPU 11 is always transferred into the cell in synchronism with the system clock. The gate for writing into the cell from the external device may be generated by the device interface and not necessarily synchronously with the system clock.

FIG. 13

FIG. 13 illustrates structure which will permit allocation of a preponderance of the time available to one or more of the virtual processors $P_0$—$P_7$ in preference to the others or to allocate equal time.

Control of the time slot allocation as between processors $P_0$—$P_7$ is by means of two of the communication registers 431. Registers 431*n* and 431*m* are shown in FIG. 13. Each 32-bit register is divided up into eight segments of four bits per segment. For example the segment 440 of register 431*n* has four bits *a*—*d* which are connected to AND gates 441—444 respectively. The segment 445 has four bits *a*—*d* connected to AND gates 446—449 respectively. The first AND gate for all groups of four (the gates for all the *a* bits), namely AND gates 441 and 446 et cetera, are connected to one input of an OR gate 450. The gates for the *b* bits in each group are connected to OR gate 451, the third, to OR gate 452 and the fourth, to OR gate 453.

The outputs of the OR gates 450—453 are connected to a register 454 whose output is applied to a decoder 455. Eight decoder output lines extend from the decoder 455 to control the inputs and the outputs of each of the virtual processors $P_0$—$P_7$.

The sequence control unit 418 is fed by clock pulses on channel 460. The sequence control 418 functions as a ring counter of 16 stages with an output from each stage. In the present case the first output line 461 from the first stage is connected to one input of each of AND gates 441—444. Similarly, the output line 462 is connected to the AND gates 446—449. The remaining 14 lines from sequencer 418 are connected to successive groups of four AND gates.

Three of the four bits 440, the bits *b*, *c*, and *d*, specify one of the virtual processors $P_0$—$P_7$ by a suitable state on a line at the output of decoder 455. The fourth bit, bit *a*, is employed to either enable or inhibit any decoding for a given set depending upon the state of bit *a* thereby permitting a given time slot to be unassigned.

It will be noted that the arithmetic unit 400 is coupled to the register 431*n* and 431*m* as by channels 472 whereby the arithmetic unit 400, under the control of the program, will provide the desired allocations in the register 431*n* and 431*m*. Thus in response to the clock pulses on line 460, the decoder 455 may be stepped on each clock pulse from one virtual processor to another. Depending upon the contents of the register 431*n* and 431*m*, the entire time may be devoted to one of the processors or may be divided equally or an unequally as the codes in the registers 431*n* and 431*m* determine.

Turning now to the control lines leading from the output of the decoder 455, it is to be understood at this point that the logic leading from the registers 431*n* and 431*m* to the decoder have been illustrated at the bit level. In contrast, the logic leading from the decoder 455 to the AU 400 for control of the virtual processors $P_0$—$P_7$ is shown, not at the bit level, but at the total communication level between the processors $P_0$—$P_7$ and the AU 400.

Code lines 463—470 extend from decoder 455 to the units $P_0$—$P_7$ respectively.

The flow of processor date on channels 478 is enabled or inhibited by states on lines 463—470. More particularly, channel 463 leads to an AND gate 490 which is also supplied by channel 478. An AND gate 500 is in the output channel of $P_0$ and is enabled by a state on line 463. Similarly, gates 491—497 and gates 501—507 control virtual processors $P_1$—$P_7$.

Gates 500—507 are connected through OR gate 508 to the AU 400 for flow of data thereto. By this means, only one of $P_0$—$P_7$ operates at any one time, and the time is proportioned by the contents of cells 440, 445, et cetera, as clocked by the sequencer 418.

In the specific embodiment of the system, the system is operated synchronously. The CPU 10 has a clock producing pulses at 50 intervals. The clock in PPU 11 produces clock pulses at 65 intervals.

Having described the invention in connection with certain specific embodiments thereof, it is to be understood that certain modifications may now suggest themselves to those skilled in the art and it is intended to cover such modifications as fall within the scope of the appended claims.

We claim:

1. A data processing system comprising a central processing unit adapted to decode instructions, a memory for storing a plurality of arrays of ordered data representing vectors, vector instructions, and vector control parameters:

a. an arithmetic unit for processing a first and second vector stream;
b. a first data channel having a buffer unit over which a first vector stream flows from memory to said arithmetic unit;
c. a second data channel having a buffer unit over which a second vector stream flows from memory to said arithmetic unit;
d. a third data channel having a buffer unit over which a third vector stream flows form said arithmetic unit to memory;
e. a vector parameter file;
f. means responsive to the acquisition of a generic vector instruction to retrieve vector control parameters from said memory and for transferring said vector control parameters to said vector parameter file; and
g. said vector parameter file responsive to the execution of a vector instruction for causing said first and second vector streams to be transferred from said memory to said arithmetic unit in a manner determined by said vector control parameters.

2. The combination according to claim 1 wherein said vector parameter file also causes said third vector stream to be transferred from said arithmetic unit to said memory in a manner determined by said vector control parameters.

3. The combination according to claim 2 wherein said vector parameter file specifies the starting address in said memory for reading said first, and second vector streams, and the starting address in said memory for recording said third vector stream.

4. The combination according to claim 3 wherein the vector parameter file specifies the number of elements in said first, second and third vector streams to be transferred between said memory work arithmetic unit.

5. A data processing system comprising a central processing unit adapted to decode instructions, a memory for storing a plurality of arrays of ordered data representing vectors, vector instructions, and vector control parameters:

a. an arithmetic unit for processing a first and second vector stream;
b. a first data channel having a buffer unit over which a first vector stream flows from memory to said arithmetic unit;
c. a second data channel having a buffer unit over which a second vector stream flows from memory to said arithmetic unit;
d. a third data channel having a buffer unit over which a third vector stream flows from said arithmetic unit to memory;
e. a vector parameter file;
f. means responsive to the acquisition of a generic vector instruction to retrieve vector control parameters from said memory and for transferring said vector control parameters to said vector parameter file; and
g. said vector parameter file responsive to the execution of a vector instruction for causing said first, second and third vector streams to be transferred between said arithmetic unit and said memory in a plurality of inner loops and outer loops.

6. The combination according to claim 5 wherein said vector parameter file specifies the number of turns of said inner loops, the number of turns of said outer loops, the address increment for said inner loop, and the address increment for said outer loop.

7. The combination according to claim 6 where said parameter file specifies the starting address in memory for reading said first and second vector streams and storing said third vector stream.

8. The combination according to claim 1 including means responsive to a vector instruction for developing said vector control parameters.

9. A data processing system for processing vector streams comprising:

a central processing unit adapted to decode instructions;
a memory for storing vector streams and vector instructions;
means for transferring a first and a second vector stream from said memory;
an arithmetic unit for processing said first and second vector streams; and
a vector parameter file having a plurality of vector parameters said central processing unit responsive to a generic vector instruction for causing said first and second vector streams to be streamed through said arithmetic unit according to said plurality of vector parameters stored in said vector parameter file.

10. A data processing system for processing vector streams comprising:

a central processing unit adapted to decode instructions;
a memory for storing vector streams and vector instructions;
means for transferring a first and a second vector stream from said memory;
an arithmetic unit for processing said first and second vector streams; and
a vector parameter file having a plurality of vector parameters said central processing unit responsive to the acquisition of a vector instruction for carrying out a vector operation upon said vector streams in said arithmetic unit in the manner specified by said vector instruction and said plurality of vector parameters stored in said vector parameter file.